(12) United States Patent
Gilson

(10) Patent No.: US 6,964,753 B2
(45) Date of Patent: Nov. 15, 2005

(54) POLYMERIZATION REACTOR AND PROCESS

(75) Inventor: Jean Marc Gilson, Midland, MI (US)

(73) Assignee: Dow Corning S.A., Seneffe (BE)

( * ) Notice: Subject to any disclaimer, the term of this patent is extended or adjusted under 35 U.S.C. 154(b) by 578 days.

(21) Appl. No.: 09/912,635

(22) Filed: Jul. 25, 2001

(65) Prior Publication Data

US 2002/0035230 A1 Mar. 21, 2002

(30) Foreign Application Priority Data

Jul. 26, 2000 (GB) .............................................. 0018162

(51) Int. Cl.⁷ ............................. G05D 16/00; C08F 2/00
(52) U.S. Cl. ....................... 422/108; 422/112; 422/131; 526/78
(58) Field of Search ................................ 422/105, 108, 422/112, 131; 526/72, 78

(56) References Cited

U.S. PATENT DOCUMENTS

| | | | | |
|---|---|---|---|---|
| 3,160,601 | A | | 12/1964 | Hyde et al. ................. 260/46.5 |
| 3,649,842 | A | * | 3/1972 | Thornhill et al. ........... 307/106 |
| 3,839,388 | A | | 10/1974 | Nitzsche et al. ......... 260/448.2 |
| 3,903,202 | A | * | 9/1975 | Carter et al. .................... 525/53 |
| 3,957,744 | A | * | 5/1976 | Deuschel et al. .............. 526/73 |
| 4,027,085 | A | | 5/1977 | Clemmer et al. |
| 4,175,169 | A | | 11/1979 | Beals et al. |
| 4,216,253 | A | * | 8/1980 | Bonnebat et al. ........ 428/36.92 |
| 4,250,290 | A | | 2/1981 | Petersen ...................... 528/14 |
| 4,294,803 | A | * | 10/1981 | Uchida et al. ............... 422/111 |
| 4,564,693 | A | | 1/1986 | Riederer ...................... 556/401 |
| 4,701,490 | A | | 10/1987 | Burkhardt et al. ........... 524/425 |
| 4,842,827 | A | * | 6/1989 | Graf et al. ................... 422/112 |
| 4,952,345 | A | | 8/1990 | Rao et al. |

(Continued)

FOREIGN PATENT DOCUMENTS

| | | | |
|---|---|---|---|
| DE | 39 14912 | 11/1990 | ........... C08G/77/10 |
| EP | 0382365 | 1/1990 | ........... C08G/77/08 |
| EP | 0522776 | 6/1992 | ............... B01J/4/00 |
| EP | 0657209 | 5/1994 | ........... C08G/77/06 |
| EP | 0860461 | 2/1998 | ........... C08G/77/08 |
| EP | 0982346 | 8/1999 | ........... C08G/77/08 |
| EP | 1175937 A2 * | 1/2002 | |
| GB | 918823 | 7/1960 | ........................ 2/7 |
| GB | 1174219 | 12/1969 | |
| GB | 1398034 | 5/1973 | |
| GB | 2252975 | 8/1992 | ........... C08G/77/08 |
| JP | 02002121287 A * | 4/2002 | |

*Primary Examiner*—Kiley Stoner
(74) *Attorney, Agent, or Firm*—Duane Morris LLP

(57) ABSTRACT

A continuous static polymerization reactor unit for the production of liquid polymers, in particular high viscosity organopolysiloxanes, in a predetermined viscosity range comprises a reactor (1) a supply means (10,25) for supplying monomers and/or oligomers to an inlet means (2), and an outlet means (5). The inlet means (2) is adapted for the introduction of a reaction mixture into a reaction chamber (3), and a means for introducing at least one viscosity controlling agent into the supply means is provided to form a reaction mixture with monomers and/or oligomers (11,13, 15,12,14,16). The unit is adapted to maintain the values of temperature and flow rate of the resulting reaction mixture/polymer in the reaction chamber (3) substantially constant. A control means (24) is used to detect any variation from a predetermined pressure drop value between the inlet means (2) and the outlet means (5), and should such a variation occur the control means (24) is also used to compute and control a compensating rate of introduction of one or more of the at least one viscosity controlling agents to cause the pressure drop between the inlet means (2) and the outlet means (5) to revert to the predetermined value. A process for making liquid polymers within a predetermined viscosity range is also disclosed.

15 Claims, 3 Drawing Sheets

U.S. PATENT DOCUMENTS

Figure 1:
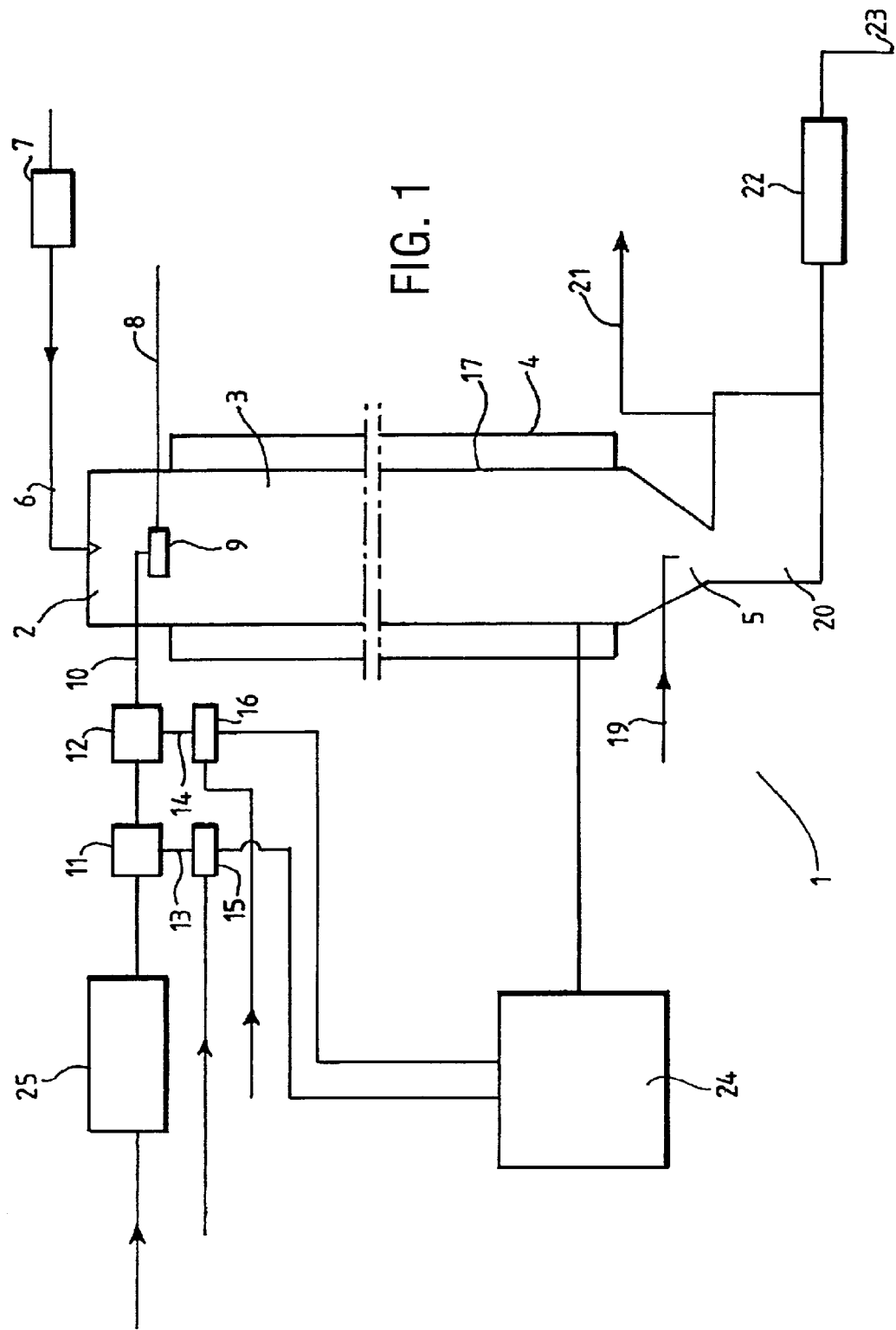

| | | |
|---|---|---|
| 5,319,120 A | 6/1994 | Gilson et al. .................. 556/453 |
| 5,339,255 A * | 8/1994 | Suzuki et al. ................. 700/269 |
| 5,504,150 A | 4/1996 | Gilson et al. .................. 524/837 |
| 5,965,674 A | 10/1999 | Moen et al. |
| 5,980,790 A * | 11/1999 | Kuwahara et al. ......... 264/37.13 |
| 6,306,658 B1 * | 10/2001 | Turner et al. ..................... 436/37 |
| 6,353,088 B1 * | 3/2002 | Fujitaka et al. ............... 528/501 |
| 6,692,708 B2 * | 2/2004 | Chandler, Jr. .................. 422/225 |
| 2002/0035230 A1 * | 3/2002 | Gilson ............................ 528/10 |
| 2003/0190755 A1 * | 10/2003 | Turner et al. ..................... 436/37 |

* cited by examiner

POLYMERIZATION REACTOR AND PROCESS

FIELD OF THE INVENTION

This invention relates to a polymerisation reactor for making liquid polymer and a means of controlling the viscosity of liquid polymer prepared in the reactor. It is particularly related to static reactors, more specifically to static reactors which are useful in the polymerisation of monomers and/or oligomers, by for example condensation reactions. The invention also relates to a process of making liquid polymers.

BACKGROUND OF THE INVENTION

Polymerisation reactors have been used for a variety of polymerisation processes. Reactors may be suitable for batch processes or continuous processes. The present invention is concerned with the latter type. Most currently available continuous polymerisation reactors are dynamic systems having some moving parts which effect the mixing of reagents and, where necessary catalyst, and which force a reaction mixture through the reactor. Dynamic reactors require a fair amount of maintenance and are subject to potential breakdown of some of the moving parts. Static continuous reactors, where no moving parts are used to force the reaction mixture through the reactor, are also known. Adequate mixing in these reactors is mostly achieved through adapted internal geometry and/or the presence of internal parts, eg baffles, in the construction of the reactor.

In existing static continuous reactors the residence time of the reagents may be quite extended, especially where efficient distribution of a catalyst and heat transfer are critical. There is still a need to provide a polymerisation process which will allow the formation of polymers in an improved manner by using an efficient static reactor.

EP-A-522 776 discloses a process for making liquid polymers by condensing monomers and/or oligomers in a polymerisation reactor. The process involves mixing monomers and/or oligomers with an appropriate amount of catalyst, mixing the resultant reaction mixture with a pressurised gas to cause it to reach a foam like consistency, feeding the foaming mixture through an inlet into a reaction chamber having a porous wall and causing the monomers and/or oligomers to polymerise. In one embodiment the inlet is an atomising device, which in conjunction with the use of additional pressurised gas and the use of a narrow reaction chamber, encourages the formation of foam. Foam creates a large air-liquid interface, encouraging the use of the process for condensation polymerisation reactions. The reactor, however, needs to be specially built for the process.

EP 0657209 discloses a process for the preparation of liquid polymers via a condensation reaction in which monomers and/or oligomers are mixed with a catalyst and dispersed by means of an atomising device to form small droplets in a reaction chamber and are caused to polymerise in the dispersed state. In this case the amount of catalyst used is added as a predetermined constant amount, which was typically about 0.001 to 5% by weight of the catalyst based on the weight of the organosilicon compounds in the premix composition. Compressed air, used to atomise the premix, was fed into and extracted from the system at the same rate.

Attempts to make liquid polymers such as organosilicon polymers on a continuous basis having a defined final viscosity range are disclosed for example in U.S. Pat. No. 4,250,290 and GB 1,174,219; U.S. Pat. No. 4,250,290 discloses a process for the continuous manufacture of diorganopolysiloxanes wherein a catalyst is added to cyclic polysiloxane monomers and the resulting mixture is passed into and through a static mixer by means of plug type flow. The polymer viscosity is controlled in a two fold manner, firstly by adding to the initial part of the mixer a chainstopping agent and secondly by inactivating the catalyst when polymerisation is completed. GB 1,174,219 discloses a process wherein the starting materials were first mixed in a mixing chamber. The resulting mixture was forced into and through a reaction chamber into a discharge member. The reaction chamber was fitted with at least one degassification zone along its length whereby gases may be removed from the reacting mixture. The viscosity of the final reaction product is controlled by the speed at which the mixture passes through the reaction chamber.

Generally, the prior art overcomes the problem of production of a polymer reaction product with an inappropriate viscosity by taking periodic viscosity measurements and using an additional mixing step whereby the reaction product is mixed with polymer of a higher or lower viscosity with a view to obtaining a polymer of predetermined required viscosity. Mixing steps of this kind result in a reaction product with a wide molecular weight distribution, a feature known, in some instances, to adversely affect the mechanical properties of the resulting polymer. Furthermore the use of an additional step leads to a longer and therefore typically more expensive process.

DE 3914912 describes a system for obtaining a high molecular weight polymer having a required viscosity whereby the viscosity of the polymer is measured as it leaves a reaction chamber and any polymer obtained which is found not to be in the range required is automatically discharged and recirculated back into the reaction chamber once the catalyst contained in the discharged polymer has been neutralised or deactivated. However, this means there is a significant period of dead time between determination of the viscosity and recirculation of sample and therefore a potentially major portion of reaction product with an incorrect viscosity will be released from the reaction chamber prior to commencement of recirculation and any change of reaction conditions or the like.

SUMMARY OF THE INVENTION

According to a first aspect of the present invention there is provided a continuous static polymerisation reactor unit for the production of liquid polymers in a predetermined viscosity range which comprises i) a reactor comprising an inlet means, an elongate hollow reaction chamber, and an outlet means ii) a supply means for supplying monomers and/or oligomers to the inlet means, said inlet means being adapted for the introduction of a reaction mixture into the reaction chamber, and iii) means for introducing at least one viscosity controlling agent into the supply means to form the reaction mixture with monomers and/or oligomers, characterised in that the unit is adapted to maintain values of temperature and flow rate of any reaction mixture/polymer in the reaction chamber substantially constant and that there is provided a control means adapted to detect any variation from a predetermined pressure drop value between the inlet means and the outlet means and to compute and control a compensating rate of introduction of one or more of at least one viscosity controlling agent into the supply means, said compensating rate causing the pressure drop between the inlet means and the outlet means to revert to the predetermined value.

The concept of "comprising" where used herein is used in its widest sense to mean and to encompass the notions of "include", "comprehend" and "consist of".

DETAILED DESCRIPTION OF THE INVENTION

For the avoidance of doubt it is to be understood that the or each viscosity controlling agent is introduced in to the supply means containing monomers and/or oligomers. The resulting mixture formed by the addition of all the viscosity controlling agents into the supply means (ie viscosity controlling agents+monomers and/or oligomers) will henceforth be referred to as the reaction mixture. The composition present in the reaction chamber, subsequent to the inlet, will henceforth be referred to as the reaction mixture/polymer (ie a combination of unreacted reaction mixture and a polymer product resulting of polymerisation of the monomers and/or oligomers).

The invention is particularly useful for making those polymers which are made by the condensation reaction of monomers and/or oligomers. It is to be understood that condensation is a chemical reaction in which two or more molecules combine, with the separation of water or some other simple substance, as defined in ASTM D883-54T. A typical example of a condensation reaction is an ester formation by reacting a carboxylic acid with an alcohol, or the formation of an ether by the reaction of two alcohols, both reactions liberating water. One particular condensation polymerisation reaction which is suitable for the process of the present invention is the formation of polysiloxane materials by condensation of organosilicon compounds having silanol groups.

The term "liquid", where used herein in relation to polymers or monomers and/or oligomers, denotes the type of materials which have a consistency enabling them to flow at a temperature of 25° C. and adapt to the shape of a receptacle in which they are placed, when submitted to a force eg gravity. For the sake of clarity it is hereby stated that the term liquid materials excludes those materials which are clearly solid, or clearly gaseous at 25° C., and atmospheric pressure and those materials which are thermoplastic at or above 25° C. For example, "liquid polymers" include both low viscosity polymers eg those having a viscosity of 20 $mm^2/s$ at 25° C. and polymers which have a high viscosity, eg gum-like materials as well as some very loosely crosslinked materials, eg certain gels which will flow under pressure.

Preferably, the inlet means is provided with a means of feeding the reaction mixture into the reaction chamber under pressure. For example, the inlet means may be provided with a pumping system to feed the reaction mixture into the reaction chamber from the supply means.

In a preferred embodiment the reaction mixture is mixed with a pressurised gas in the inlet means, the gas being used to force the reaction mixture/polymer through the reaction chamber of the reactor. This pressurised gas may be any suitable gas, eg air or nitrogen. In this preferred embodiment the mixing of the gas with the reaction mixture is effected in a way which will cause the reaction mixture to reach a foam-like consistency. In this way a large air liquid interface is created, making the system especially useful for condensation based polymerisation reactions.

Most preferably the inlet means is provided with an atomiser. Where pressurised gas is used some of the gas may be employed to aid the atomisation of the reaction mixture. Atomisers are well known in the art. The reaction mixture may be atomised by any conventional means, for example by pressurising the reaction mixture through an atomising device causing it to form a spray of small particles. An alternative, and more commonly used, method is the use of a pressurised gas, eg compressed air or nitrogen, to atomise the reaction mixture when it passes through the device. This is often referred to as the 2-fluid nozzle system. Also commonly used is the so-called rotary atomiser which causes the reaction mixture to form small droplets by feeding it onto a fast rotating plate. Where the reaction mixture is atomised, the additional use of pressurised gas and the narrowness of the reaction chamber into which the mixture is fed causes the composition to reach a foam-like consistency in which all ingredients are exceptionally well dispersed and mixed.

The reaction chamber is elongate and preferably has a circular cross-section. Substantially cylindrical reaction chambers are easier to manufacture than reaction chambers with other cross-sections and have a preferred geometry for good mixing and elimination of dead space. Most preferably the reaction chamber is an elongate tube, which is substantially straight, coiled, helical or of any other suitable shape. A coiled or helical reaction chamber has the advantage of reducing the required overall length or height of the reactor. The term elongate, is intended to mean that the length of the reaction chamber in the direction of flow of the reaction mixture/polymer is at least twice the diameter of the reaction chamber at its widest point. Preferably the internal diameter of the reaction chamber is from 2 to 25 cm, more preferably from 5 to 10 cm. Larger diameters are also possible, but will only be efficient if sufficient reaction mixture is provided to cause sufficient flow in the reactor to ensure efficient mixing and heat transfer in the reaction mixture/polymer. Adequate flow rates for large diameter reaction chambers would be impractical in most cases. A preferable length of reaction chamber would be from 25 cm to 50 meters, more preferably 20 to 40 m in length. The reaction chamber may have a porous wall of the type described in European patent application No 0522776, but is preferably non-porous, for example it may be made from a carbonised steel.

The wall of the reaction chamber is preferably surrounded by an insulating jacket which is spaced from the wall so as to form a cavity around the wall. The insulating jacket may take the shape of the reaction chamber, and thus be elongate and cylindrical in shape. Alternatively the insulating jacket may be a cuboid or short cylindrical shape inside which the reaction chamber is placed, eg where the latter is coiled or helical, as referred to above. The insulating jacket may be made of any suitable material provided that in the event of the reaction chamber having a porous wall, the outside of the insulating jacket is impermeable to the fluid which is to be fed through the porous wall into the reaction chamber. Suitable materials include galvanised or stainless steel, glass, plastic or enameled metal. The insulating jacket may be provided with a heating and/or cooling facility in order to ensure that the temperature of the reaction chamber remains constant throughout the reaction process.

The outlet means may comprise any appropriate units for working up the reaction such as a means for neutralising the catalyst, de-aeration, filtering and other techniques required to finish the polymerisation process.

The supply means is preferably a pipeline in which there may be situated one or more premixers. The or each premixer may take any suitable form, but is preferably adapted to receive and mix monomers and/or oligomers with a viscosity controlling agent. Preferably each viscosity controlling agent may be introduced into a premixer on a continuous basis at either a fixed or variable rate as deemed necessary.

The premixer additionally has an outlet through which the resulting monomers and/or oligomers/ a viscosity controlling agent mixture leaves the premixer to be fed into either a further premixer as defined above, for the introduction of a further a viscosity controlling agent or into the reaction chamber through the inlet means. The or each premixer may incorporate a heating mechanism thereby enabling the temperature of the reaction mixture to be raised to an elevated temperature, eg the reaction temperature prior to introduction into the reaction chamber. However, it is preferred for the monomers and/or oligomers to be passed through a heat exchanger prior to being introduced into any premixers in the system. In such a system the monomers and/or oligomers are recirculated in the heat exchanger until they reach the required reaction temperature before being allowed to progress further downstream in the supply means. Alternatively, or additionally, the reaction mixture may be heated by using heated pressurised gas or by heating the reaction chamber into which the reaction mixture is fed in order that the temperature of the reaction mixture/polymer, moving through the reaction chamber, is maintained substantially constant throughout the length of the reaction chamber. Most preferably the reaction mixture and gas are each heated by means of heat exchangers and are prevented from being introduced into the reaction chamber until predetermined temperature values have been reached.

Viscosity controlling agents in accordance with this invention may be largely divided into two groups, which will henceforth be referred as "activators" and "deactivators". It is to be understood that Activators are compounds such as catalysts whereby an increase in the amount of activator present in the reaction mixture increases the reaction rate in the reaction mixture/polymer, resulting in an increase in viscosity of the resulting polymer, and deactivators are compounds where by an increase in the amount of deactivator present in the reaction mixture will effectively limit or decrease the viscosity of the resulting polymer. Examples of deactivators include polymer end-blockers which terminate polymer chains, an increased amount of which cause the formation of polymers having shorter chain lengths. It is anticipated that a catalyst is almost certain to be used in all polymerisation reactions undertaken using this invention. In some polymerisation systems, the catalyst may be introduced into the monomers and/or oligomers, under the control of the control means and in other systems catalyst is introduced at a permanently constant rate and another viscosity controlling agent, typically a deactivator, is introduced under the control of the control means.

Preferably the means for introducing each viscosity controlling agent into a premixer is a controllable pump which is able to pump viscosity controlling agent, preferably in liquid form, from a reservoir along a tube or pipe or the like into the required premixer. However, any suitable alternative continuous dosing apparatus may be utilised. Preferably the flow rate of the or each pump is controllable from 0% flow rate, ie when no viscosity controlling agent is introduced into the monomers and/or oligomers, to 100% flow rate whereby the maximum flow rate of viscosity controlling agent may be introduced into monomers and/or oligomers. Most preferably the means for introducing at least one viscosity controlling agent into the supply means, typically as aforementioned a pump, is adapted to receive and process a signal from the control means, which signal indicates the flow rate of the viscosity controlling agent passing through the pump.

The control means may be any appropriate controlling system able to control polymer being made in a reaction unit in accordance with this invention. The control means may control the input of one or more viscosity controlling agents but preferably is adapted to control the input of one viscosity controlling agent at any one time. In particular the control means may be a computer based system, able to monitor pressure drop in the reaction chamber by, receiving pressure drop information from a pressure detecting means and being programmed such that it is able to translate the received information into a form which allows it to calculate a compensating flow rate of viscosity controlling agent and transmit a signal detailing the result of the calculation in a form suitable to cause the means for introducing each viscosity controlling agent into a premixer to initiate the compensating flow rate.

Preferably the pressure detecting means comprises a manometer able to periodically or continuously detect a value of the pressure drop between the inlet means and outlet and a pressure transmitter adapted to transmit the value to the control means.

Typically the residence time in the reaction chamber is no more than a few minutes preferably about 1 minute or less.

In the past it has proven very difficult to control the viscosity of a polymer made in a continuous system using reaction chambers as described above because many factors tend to affect the degree of polymerisation, eg temperature and catalyst concentration. This is largely because of the variable nature of the conditions endured by reaction mixture/polymer in the reaction chamber. However, the inventors have identified the fact that the viscosity of the polymer may be controlled by measurement of the pressure drop which occurs between the inlet means and outlet means of the reaction chamber. In general, pressure drop in a tube is caused by frictional force between a fluid in the tube and the tube wall. In order to overcome this frictional force, one needs a certain pressure difference between the tube inlet and the tube outlet. The pressure drop was determined experimentally to be related with the viscosity of the polymer. This can be intuitively understood as the more viscous the fluid, the greater the "force" required to push it through a tube. Factors that usually affect the pressure drop include liquid holdup in the reactor, reaction mixture/polymer fluid density and temperature, reaction chamber dimensions (typically diameter) and air flow.

The three most important variable factors which have been identified to particularly influence the size of the pressure drop are the temperature of the reaction mixture/polymer whilst resident in the reaction chamber, the flow rate of reaction mixture/polymer passing through the reaction chamber and the viscosity of the final polymer leaving the reaction chamber from the outlet means. It has been found that by maintaining the temperature and flow rate constant one can maintain excellent control of the final viscosity of the polymer by detecting deviations in pressure drop from a predetermined or set point value (SP) required for the production of a polymer of a required viscosity by adjusting the amount of a viscosity controlling agent being introduced into the premixer.

Any change in pressure drop, ie the process value (PV) is compared with the set point. When SP≠PV, the difference, control error (E), is used to determine the compensation in flow rate of the or each viscosity controlling agent needed to be introduced into the monomers and/or oligomers, to return the value of E to zero.

Typically if E is a positive number, ie where SP>PV, the viscosity of the polymer would be lower than is required. In such a scenario if the viscosity controlling agent is an activator such as a catalyst, then an increase in flow rate of the viscosity controlling agent is required to return the pressure drop to the predetermined value (ie where E=0). If the viscosity controlling agent is a deactivator such as an end-blocker, then a decrease in flow rate of the viscosity controlling agent is required to return the pressure drop to the predetermined value. Conversely of course if the value of E is negative, ie if SP<PV, then the resulting viscosity would be greater than is required and the flow rate of viscosity controlling agent into the premixer is accordingly reduced when an activator and increased when a deactivator.

The control means determines an output value (OV) which is dependent on the value of E. The output value is sent as a signal to a means for introducing a viscosity controlling agent (henceforth referred to as a pump) into the monomers and/or oligomers.

The value of OV is calculated as a percentage of the maximum pump flow rate, wherein 100%, is the maximum flow rate and 0% is where no catalyst is being introduced into the system. Typically each pump being used to controllably introduce viscosity controlling agent into the monomers and/or oligomers will operate such that the viscosity controlling agent is introduced into the premixer at a constant rate unless or until SP≠PV.

It has been found that the most accurate method of determining the value of OV is not merely a direct proportional relationship with E. A number of control functions or ways by which the pump will react to changes in the value of E need to be considered in order to ensure a stable process. The three most significant are the proportional, integral and differential control functions.

The proportional control function relates to the direct proportional relationship between OV (and the rate of catalyst flow) and the control error E according to equation 1 for condensation polymerisation systems with a single viscosity controlling agent, a catalyst being used is:

$$OV = \frac{100}{PB} \times (SP-PV) = \frac{100}{PB} \times E \quad (1)$$

where PB is a value henceforth identified as the proportional band width (PB).

This relationship is the simplest form of control of the system but however when considered alone proportional control does not result in a fully controlled system. For most cases, other control functions, in particular Integral or Differential control functions are required to obtain a stable process.

The Integral control function is a control of the velocity at which the catalyst flow is changed. Hence, if for instance the value of E doubles, the catalyst flow will be adjusted twice as fast. The Integral function is mainly required for very fast processes. It can for example control the action of the control means so as to avoid "over"-reaction to a control error. The Integral control function may also eliminate permanent control errors, for example, in the event that E was varying with time in a wave form, ie a purely proportional action there would occur a permanent control error because of the delay between the change in catalyst flow and the impact on the pressure drop and Integral control would eliminate such an error. Integral control for condensation polymerisation systems is derived from equations 2 and 3 below:

$$\frac{\delta(OV)}{\delta t} = \frac{100}{PB \times T_I} \times (SP-PV) = \frac{100}{PB \times T_I} \times E \quad (2)$$

or after integration with time $$OV = \frac{100}{PB * T_I} \int_0^t (SP-PV) \cdot dt \quad (3)$$

$T_I$ is a constant which henceforth will be referred to as integral time.

Differential control relates to the relationship of OV (and the catalyst flow) with the velocity at which the control error E changes. This means that the output value (and hence the catalyst flow) is constant unless the control error changes. The Differential control function for condensation polymerisation systems is mainly required for slow systems, because OV changes more rapidly than E which for condensation polymerisation systems can be determined from equations 4 and 5 below.

$$OV = \frac{100}{PB} \times T_D \times \frac{\delta(SP-PV)}{\delta t} = \frac{100}{PB} \times T_D \times \frac{\delta E}{\delta t} \quad (4)$$

or, since SP is kept constant for our case $$OV = -\frac{100}{PB} \times T_D \times \frac{\delta(PV)}{\delta t} \quad (5)$$

where $T_D$ is a constant which henceforth will be called the differential time.

Each of the above three control functions may be an important consideration for the overall control of the relationship between E and OV and the overall control of the relationship requires an input of all three control functions in accordance with the following relationship $$OV = \frac{100}{PB}\left[(SP-PV) + \frac{1}{T_I}\int_0^t (SP-PV)*dt - T_D * \frac{dPV}{dt}\right] \quad (6)$$

The parameters of the control means which need to be tuned are PB, $T_I$, and $T_D$. By determining these values, one can control the viscosity of the resulting polymer leaving the reaction chamber outlet means.

In accordance with another aspect of the present invention there is provided a process for making liquid polymers within a predetermined viscosity range in a polymerisation reactor, comprising:
adding one or more viscosity controlling agents into a stream of monomers and/or oligomers at a variable rate, to form a reaction mixture,
feeding the reaction mixture through an inlet means into a reaction chamber,
causing the reaction mixture/polymer to polymerise in the reaction chamber and collecting resulting polymer at a polymerisation reactor outlet means characterised in that reaction mixture/polymer flow rates and temperatures are maintained at substantially constant values, and that pressure drop values between the inlet means and the outlet means are monitored by a control means which is adapted to detect variations in said pressure drop from a predetermined value, and should such variations occur, to compute and control a compensating rate of introduction one or more of the at least one viscosity controlling agents, said compensating rate causing the pressure drop between the inlet means and the outlet means to revert to the predetermined value.

The process of the invention is particularly preferred for the manufacture of liquid organosiloxane materials by polymerisation of organosilicon compounds having silicon-bonded —OR radicals, in which R represents a hydrogen atom or an alkyl group having up to 6 carbon atoms provided that at least some of the R groups are hydrogen atoms. It is preferred that at least one R group per molecule represents a hydrogen atom and most preferred that each R group represents a hydrogen atom. Although organosilicon compounds for use in the process of the invention may have a number of silicon-bonded groups —OR per molecule, it is preferred that no more than two —OR groups are present on each molecule. This will encourage the formation of substantially linear polysiloxane materials. In most instances the organosilicon compounds will additionally contain silicon-bonded organic substituents. Organosilicon compounds forming the monomers and/or oligomers in the process of the invention may be organosilanes, organosiloxanes, silcarbanes or mixtures of two or more thereof.

The preferred organosilicon compounds comprise short chain linear polydiorganosiloxane materials having silanol end-groups. These materials have the average general formula

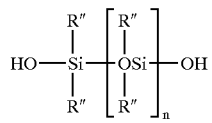

wherein n is an integer, preferably having a value of no more than 300 and each R" is a silicon-bonded organic substituent which may be, for example, a monovalent hydrocarbon group having from 1 to 14 carbon atoms, for example an alkyl, aryl, aralkyl, alkaryl or alkenyl group or a monovalent substituted hydrocarbon group having from 1 to 10 carbon atoms, for example an amino-substituted alkyl or aryl group, mercaptoalkyl group, haloalkyl group, esterified carboxyalkyl group, polyoxyalkylene group and hydroxyalkyl group. Specific examples of suitable silicon-bonded organic substituents which may be present in the organosilicon compounds employed in the process of the invention are methyl, ethyl, propyl, hexyl, dodecyl, tetradecyl, phenyl, xylyl, tolyl, phenylethyl, vinyl, allyl, hexenyl, —R'NH$_2$, —R'NHCH$_2$CH$_2$NH$_2$, —R'SH, —R'Br, —R'Cl and R'OH, wherein R' represents a divalent organic group, preferably having less than 8 carbon atoms, for example —(CH$_2$)$_3$— or —CH$_2$CHCH$_3$CH$_2$—, arylene, eg —C$_6$H$_4$— or aralkylene, eg —(C$_6$H$_3$.CH$_3$)—. For the majority of commercial applications at least 50% of the silicon-bonded organic substituents will be methyl groups, any remaining groups being selected from vinyl and phenyl groups. More preferably at least 80% of all silicon-bonded organic substituents are methyl groups, most preferably, substantially all silicon-bonded organic substituents are methyl groups. In the preferred polydiorganosiloxanes each R" denotes a methyl group and n has a value of from 10 to 300, more preferably 50 to 150, most preferably from 75 to 100.

As a general principle, an organosilicon compound which is a siloxane polymer as described above is to be regarded as an oligomer for the purpose of this invention, as long as it has a shorter siloxane chain length than the polymer obtained by the process of the invention.

In the process of the invention, silanol end-blocked polydiorganosiloxanes of a very narrow high viscosity range may be produced by controlling the introduction of catalyst into the monomers and/or oligomers. However, as discussed in the first aspect of the invention, condensation products may be controlled by means of the introduction of deactivator groups, in which case the rate of introduction of such deactivator groups may be utilised to control the polymer viscosity as opposed to the rate of catalyst introduction. Typically the resulting polymer is end-blocked with triorganosiloxy units. The end-blocking process aims to replace the silanol end-groups with triorganosiloxy groups to prevent further condensation reaction. This may be achieved by incorporating a triorganoalkoxy silane or a triorganosilanol in to the monomers and/or oligomers. Examples of such silanes are trimethyl methoxysilane, methyl phenyl dimethoxysilane, methyl phenyl vinyl ethoxysilane and aminopropyl trimethoxy silane. Alternatively and more preferably polydiorganosiloxane materials, which are end-blocked with a triorganosiloxane group at one end and a hydroxyl diorganosiloxane group at the other end may be utilised in the reaction mixture. A still further alternative way is the use of lower molecular weight polydiorganosiloxanes having only triorganosiloxane end-groups, for example R$_3$Si—O—SiR$_3$. However, use of the latter usually requires a catalyst having some activity in the breaking of the siloxane Si—O—Si bond. Suitable triorganosiloxane end blocking units include a wide variety of materials, such as trialkylsiloxanes, dialkylalkenylsiloxanes and dialkylarylsiloxanes, eg trimethylsiloxane, triethylsiloxane, dimethylvinylsiloxane and dimethylphenylsiloxane. Yet another alternative is the use of a silazane, eg hexamethyldisilazane.

The preferred process of the invention is suitable for use in the preparation of a variety of organosiloxane products by a condensation reaction. The preferred process of the invention involves contacting organosilicon compounds, which are monomers and/or oligomers, with a catalyst at a temperature at which the desired rate of polymerisation occurs. It is preferred for the production of polysiloxane materials that the temperature employed is in the range of from about 30° C. to 300° C.

Reactions at lower temperatures are normally too slow to be of commercial interest. More preferably the polymerisation reaction is carried out at a temperature of from 50 to 200° C., most preferably 70 to 180° C.

The process in accordance with this invention may also be utilised for the polymerisation of cyclosiloxanes such as decamethylcyclopentasiloxane and octamethylcyclotetrasiloxane by equilibration reaction to form long chain polymers.

It is preferred to employ from 0.001 to 5% by weight of catalyst based on the weight of the organosilicon compounds in the reaction mixture, although the rate of introduction of catalyst can be varied such that at any one time a greater or smaller amount of catalyst is being used to ensure an end-product with a required viscosity is produced, said rate being dependent on the value of E, defined above. Catalysts are preferably delivered in the form of a liquid or solution and may comprise any suitable catalyst for the reaction process. Some catalysts will promote condensation reactions but also act as equilibration catalysts. These are exemplified by sulphuric acid, hydrochloric acid, Lewis acids, sodium hydroxide, tetramethylammonium hydroxide, tetrabutyl phosphonium silanolate and amines. Such catalysts, though not preferred, are useful provided the presence of low molecular weight species in the polymer is not to be avoided, or provided the catalyst is inactivated prior to the rearrangement of polymers. More preferred are condensation specific catalysts. These include dodecylbenzene sulphonic acid, n-hexylamine, tetramethylguanidine, carboxylates of rubidium or cesium, hydroxides of magnesium, calcium or strontium and other catalysts as are mentioned in the art, eg in GB patent specifications 895091, 918823 and EP specification 382365. Also preferred are catalysts based on phosphonitrile chloride, for example those prepared according to U.S. patent specifications U.S. Pat. Nos. 3,839,388 and 4,564,693 or EP application 215 470 and phosphonitrile halide catalysts as described in GB2252975, having the general formula $[X(PX_2=N)_sPX_3]^+[MX_{(v-t+1)}R'''_t]^-$, wherein X denotes a halogen atom, M is an element having an electronegativity of from 1.0 to 2.0 according to Pauling's scale, $R'''$ is an alkyl group having up to 12 carbon atoms, s has a value of from 1 to 6, v is the valence or oxidation state of M and t has a value of from 0 to v−1. Other catalysts which may be utilised, particularly in equilibration reaction systems are phosphazene base type catalysts as described in EP 0860461 and European patent application No 99306738.8.

Termination of the polymerisation reaction, if desired, may be achieved by conventional and well known methods. For example the temperature of the reaction mixture/polymer may be lowered beyond the point where the catalyst is active. Alternatively, the reaction mixture/polymer may be heated to a point where the catalyst is inactivated, eg by decomposition, provided the polymer is not affected by such action. Yet another alternative termination procedure is the introduction of an inactivation agent. This will depend on the type of catalyst used, and may be a neutralisation agent where the catalyst is acidic or alkaline. Suitable neutralisation agents include amines, epoxy compounds and mild acid materials.

The process according to the invention is capable of providing very high viscosity polymers eg polymers of 1000000 mm$^2$/s at 25° C. or more but preferably is used to prepare polymers with a viscosity up to about 500000 mm$^2$/s at 25° C. The resulting polymer prepared in accordance with the process of the invention is useful in a number of applications, as is well known in the art of organosilicon compounds. The invention provides in another of its aspects, liquid polymers which are prepared by the process of the invention, in particular, liquid organosiloxane materials thus prepared. Examples of suitable applications include treatment of textiles to render them water repellent, paper coating to impart high release surfaces, manufacture of sealant and adhesive products and production of elastomer-forming compositions.

It is to be understood that there are a number of advantages in this present system over the prior art for example by controlling the viscosity as described in the present invention values of E≠0 are detected in such a way that the variations can be corrected before the polymer not meeting the required specifications leaves the outlet means. Furthermore, polymer leaving the outlet means contains a lot of air bubbles and as such the polymer viscosity is very difficult to measure.

EXAMPLES

The invention will now be described by way of example and with reference to the accompanying drawings in which FIG. 1 is a schematic view of the reactor, FIG. 2 shows graphical examples of a change in the pressure drop across the reactor during the reaction process, and FIG. 3 shows graphical examples of the three main control functions reacting to the change in pressure drop in FIG. 2.

All viscosity values were taken at 25° C. unless otherwise indicated.

Figure 4:
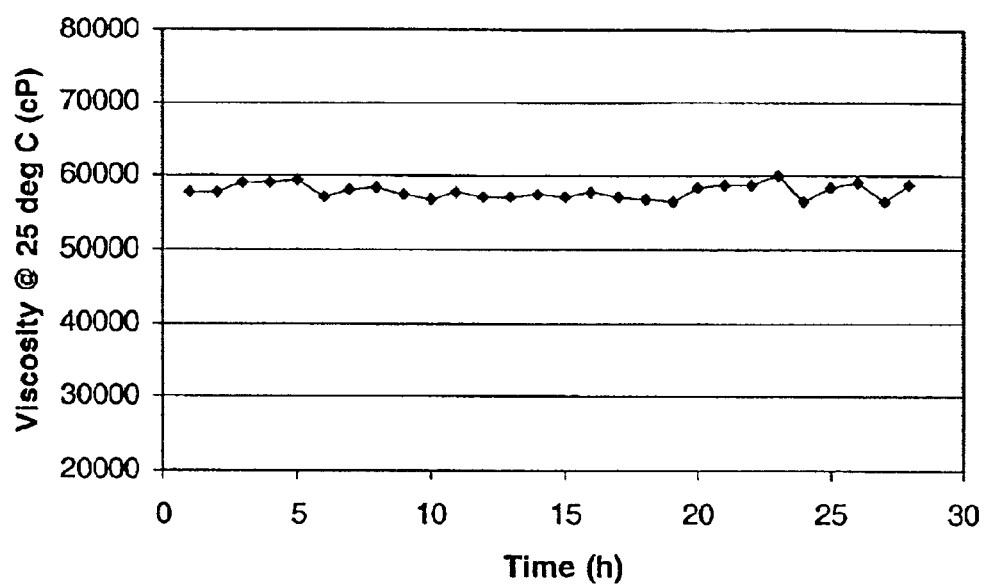

FIG. 4 is a graphical representation of the variation of viscosity of end product compared with time for polymer prepared using a unit in accordance with the present invention.

Examples further illustrating the process according to the invention in which all parts and percentages are expressed by weight are also provided.

Referring to FIG. 1 the exemplified reactor (1) consists of an inlet means (2), a carbonised steel reaction chamber (3), an insulating jacket (4) and an outlet means (5). It is to be understood that for means of simplification a linear reaction chamber is shown in FIG. 1, however usually reaction chambers of the length used in the following examples will be of a spiral shape. The inlet means (2) comprises a compressed air line (6) which passes compressed air from a compressor (not shown) through a heat exchanger (7). A second compressed air supply (8) is linked to an atomising device (9) which in this case is a two-fluid nozzle. Also linked to atomising device (9) is a supply line for the reaction mixture (10) which has a premixer (11) installed along the line for mixing in a catalyst and premixer (12) for mixing in any other viscosity controlling agent, typically an end-blocker. The catalyst and other viscosity controlling agent (when required) is/are introduced into the premixers (11,12) by way of supply lines (13) and (14) and the rate of introduction of the or each viscosity controlling agent is/are controlled by means of pumps (15) and (16) respectively. The monomers and/or oligomers are fed into line (10) through heat exchanger (25). Heat exchanger (25) has a three way switch intended to be used to prevent monomers and/or oligomers entering line (10) until said monomers and/or oligomers have reached a predetermined temperature. Reaction chamber (3) is a tube with a circular cross-section and is typically formed in a helical shape (not shown), having an internal diameter of 50.8 mm, and a total length of 25 m. Insulating jacket (4) surrounds outer wall (17) of reaction chamber (3) and maintains reaction chamber (3) at a predetermined constant temperature. Outlet means (5) comprises an inlet for a neutralisation agent (19) a de-aeration tank (20), to which is linked an extraction system (21), a filtration system (22) and a drum-off point (23). A manometer (not shown) is used to measure the pressure drop between inlet (2) and outlet means (5) and the resulting pressure drop is transmitted to system control means (24) by way of a pressure transmitter (not shown). Control means (24) continuously monitors the pressure drop along the length of the reaction chamber. Control means (24) is linked to pumps (15) and (16) and is able to control the respective flow rates of catalyst and the other viscosity controlling agent (when used) into the reaction mixture.

In use monomers and/or oligomers are fed through heat exchanger (25) onto line (10) and viscosity controlling agents are introduced into the reaction mixture at premixers (11) and (12) when required. The resulting reaction mixture is fed into atomiser (9), together with some compressed air from line (8). A separate supply of heated compressed air from line (6) forces the atomised reaction mixture to foam and be forced through reaction chamber (3) at a constant flow rate. At outlet means (5) a neutralisation agent is added through line (19) into the foam-like mixture of polymer and compressed air. The resulting neutralised mixture is then de-aired (21), filtered (22) and collected in drums. Control means (24) monitors the value of E, by receiving a signal from a pressure transmitter connected to the manometer, with a view to maintaining a substantially constant pressure drop value. In the event that a change in pressure drop occurs, control means (24) issues a signal to the variably controlled viscosity controlling agent pump ((15) for catalyst) and a compensating change in flow rate is actuated by pump (15) to compensate for the change in the value of E and return the pressure drop back to the predetermined value (E=0), thereby ensuring that the viscosity of the resulting polymer is within the range required.

Figure 2A:
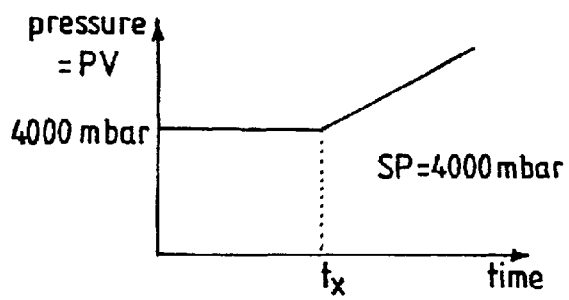
Figure 2B:
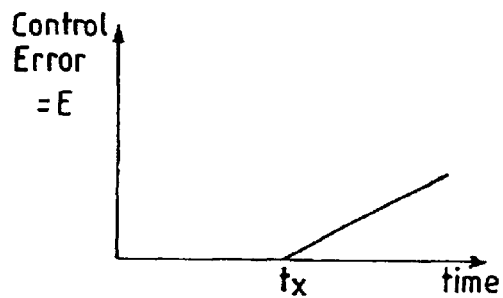

Referring now to FIG. 2, graph 2a shows that the polymerisation process has been running at a stable pressure drop of 4000 millibars (mbar, $4\times10^5$ Pa) for $t_x$ hours, ie E=0 and therefore a constant rate of viscosity controlling agent, in this case a catalyst, has been introduced into premixer (11) during this period. However as seen in both FIGS. 2a and 2b at time $t_x$, the pressure starts to increase linearly with time.

Figure 3A:
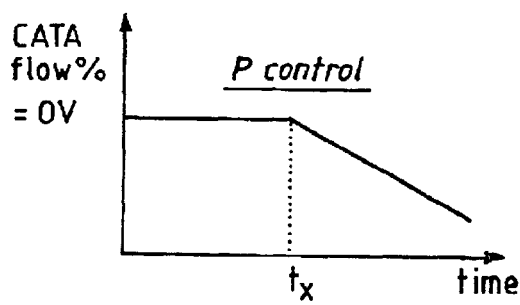
Figure 3B:
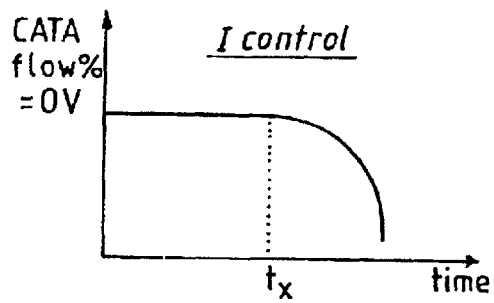
Figure 3C:
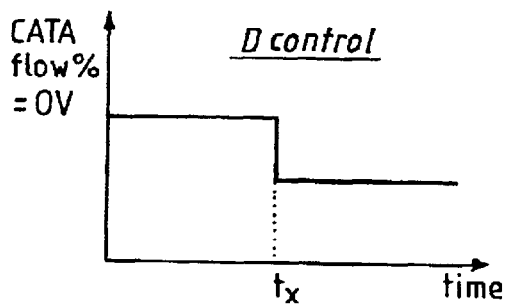

Control means (24) actuates the introduction of a compensating amount of catalyst through pump (15). The effect of the different control functions as described is shown in FIG. 3 wherein FIG. 3a shows that proportional (P) control function results in a constant reduction in catalyst flow proportional to the control error. The integral (I) control function (FIG. 3b) initially adjusts the catalyst flow to be slower than P control, but adjusts faster and faster as the control error continues to increase. Differential (D) control function (FIG. 3c) causes a step change in the catalyst flow. The overall flow rate change being the cumulative result in accordance with equation 6 above.

It has been determined that the value of the proportional band width (PB) for condensation of purely OH polymers is not a constant and therefore precautions are required for a smooth startup of the unit. This is because the viscosity controlling agent in such systems is usually a catalyst and in the initial phase of the process when the system is starting to operate it is necessary to adjust the catalyst flow rate very rapidly at the start of the process (particularly in cases requiring high initial catalyst dosings) and slower when the process is stable (low catalyst dosings). To overcome this problem, the value of the proportional band width is adjusted according to the output value, as indicated in Table 1.

TABLE 1

Proportional band width for different output values

| Output value (%) | PB |
|---|---|
| 0 | 2500 |
| 6 | 2500 |
| 12 | 1250 |
| 26 | 580 |
| 50 | 300 |
| 99 | 150 |

The above is not usually required in cases where the viscosity controlling agent used to compensate E is an end-blocker as catalyst is usually being added into the system at a constant rate. It will be noted that the value of the proportional band width is low when OV is high, which means that upon starting a reaction OV is high as the pressure is significantly below SV and as such there is a large proportional control action. However, when the system has reached a steady state OV is small and a high proportional band width is applied (ie low proportional control action).

Example 1

This example describes the polycondensation of OH end-blocked polydimethylsiloxane polymer with a viscosity of 330000 mm$^2$/s. (Target Range 300000 to 360000 mm$^2$/s) using a reactor having a helical coil of 50 mm internal diameter and a length of approximately 25 m.

Low viscosity linear silanol monomers and/or oligomers (viscosity 70 mm$^2$/s) were fed along the supply means to the inlet means at a controlled rate of 450 kg/hour. The monomers and/or oligomers were heated and recirculated in a heat exchanger prior to introduction into a premixer for mixing with catalyst. The required temperature was, 155° C.

The air used to force the reaction mixture/polymer through the reaction chamber was heated to a temperature of 200° C. in a heat exchanger prior to introduction in to the reaction chamber. Once both the required reaction mixture and air temperatures are reached catalyst was introduced into the monomers and/or oligomers stream. The catalyst, a phosphonitrile chloride was added in an amount of 40 g per liter of dichloromethane to the stream of monomers and/or oligomers. The flow rate of the catalyst was driven by a Prominent® micro gamma pump which in turn is controlled by means of a $\frac{4}{20}$ mA signal from a Fisher & Porter model 5000 control unit.

The value of SV in the reaction chamber was set at approximately 2750 mbar.

The polycondensation reaction proceeded to low silanol levels (ie high viscosity) driven by the hot air stream at a flow rate of 175 Nm$^3$/hour.

The condensation reaction which occurred within the reaction chamber lead to an increase in viscosity and hence to a pressure drop PV in the reactor as the flow rates and the temperatures are kept constant. The system had a very short response time and the value of E was maintained at substantially zero by increasing or decreasing the rate of introduction of catalyst into the monomers and/or oligomers in response to changes in the value of E. At the outlet means a mixture of 144 g/liter of trihexylamine diluted in decamethylcyclopentasiloxane fluid was injected into the polymer to neutralise the catalyst thereby forming a stable polymer. A dynamic mixer was used to ensure good dispersion of the neutralisation agent in the polymer. Finally polymer was separated from air in a separator.

Example 2

Production of trimethyl end-blocked polymer with a viscosity of 60,000 (range 57,000 to 63,000) using a 25 meters long reaction chamber having an internal diameter of 50 mm.

In this example the rate of catalyst introduction was maintained at a constant rate and the viscosity controlling agent relied upon to compensate for pressure drop changes was the end-blocker, a trimethyl siloxane end-blocked polydimethylsiloxane with a viscosity of 50 mm$^2$/s. The initial flow rate of end-blocker into the monomers and/or oligomers was ~10 kg/hour. In this case both condensation and rearrangement reactions were taking place and so if the pressure drop were to increase the viscosity would increase and it would be necessary to increase the amount of end-blocker in the system. The process undertaken was basically the same as described in example 1 although the reaction mixture/polymer flow rate was 250 kg/hour at a temperature of 170° C., the air flow rate was 250 Nm$^3$/hour at 200° C. The catalyst again a phosphonitrile chloride, diluted with dichlormethane at a concentration of 40 g/liter, was fed into the monomer and/or oligomers stream at a constant rate of 2 ml/min.

A neutralisation agent was added to polymer in the outlet means. The neutralisation agent being a mixture of 144 g/liter of trihexylamine in decamethylcyclopentasiloxane and being introduced at a rate of 5 ml/min. The value of SV was taken to be 1930 mbar. Table 2 shows the variation in viscosity of the resulting polymer over a period of 28 hours. A graphical representation of Table 2 is provided as FIG. 4.

TABLE 2

| Time (h) | Viscosity (cP) |
|---|---|
| 1 | 57669 |
| 2 | 57800 |
| 3 | 58994 |
| 4 | 59111 |
| 5 | 59242 |
| 6 | 57276 |
| 7 | 58194 |
| 8 | 58456 |
| 9 | 57538 |
| 10 | 56752 |
| 11 | 57931 |
| 12 | 57276 |
| 13 | 57141 |
| 14 | 57407 |
| 15 | 57276 |
| 16 | 57669 |
| 17 | 57230 |
| 18 | 56752 |
| 19 | 56490 |
| 20 | 58456 |
| 21 | 58856 |
| 22 | 58718 |
| 23 | 60029 |
| 24 | 56490 |
| 25 | 58456 |
| 26 | 58952 |
| 27 | 56490 |
| 28 | 58635 |
| Averaged = | 57903 |
|  | 59694 |

What is claimed is:

1. A continuous static polymerisation reactor unit for the production of liquid polymers in a predetermined viscosity range which comprises:
   a) a reactor comprising an elongate hollow reaction chamber having two ends, one end defining an inlet means adapted for the introduction of a reaction mixture into the reaction chamber, and the other end defining an outlet means;
   b) a supply means in communication with the inlet means for supplying liquid monomers, oligomers, or mixtures thereof to said inlet means; and
   c) means for introducing at least one viscosity controlling agent into the supply means to form a reaction mixture with the monomers, oligomers or mixtures thereof,
wherein the temperature and flow rate values of the resulting polymer in the elongate hollow reaction chamber are maintained substantially constant; and
   d) a control means adapted to detect and correct any variation from a predetermined pressure drop value between the inlet means and the outlet means.

2. The reactor unit as recited in claim 1, wherein the reaction mixture is mixed with a preheated pressurised gas at the inlet means.

3. The reactor unit as recited in claim 2, further comprising an inert gas supply to the inlet means, wherein said inert gas supply is adapted to cause the reaction mixture to reach a foam-like consistency.

4. The reactor unit as recited in claim 1, wherein the means for introducing the at least one viscosity controlling agent into the supply means comprises a pump, adapted to receive and process a signal from the control means, wherein the signal indicates the flow rate of the viscosity controlling agent passing through the pump.

5. The reactor unit as recited in claim 1, wherein the reaction chamber is a hollow cylinder having a diameter of from about 20 to about 250 mm, and a length of from about 250 to about 20,000 mm.

6. The reactor unit as recited in claim 1, wherein the control means is a computer based system, able to monitor pressure drop in the reaction chamber by receiving pressure drop information from a pressure detecting means, and programmed such that said control means (a) translates the received information into a form which allows it to calculate a compensating flow rate of viscosity controlling agent, and (b) transmits a signal detailing the result of the calculation in a form suitable to cause the means for introducing each viscosity controlling agent into a premixer, to initiate the compensating flow rate.

7. The reactor unit as recited in claim 6, wherein the pressure detecting means comprises (a) a manometer which detects a value of the pressure drop between the inlet means and outlet means, and (b) a pressure transmitter adapted to transmit the value to the control means.

8. A process for making liquid polymers within a predetermined viscosity range in a polymerisation reactor, comprising:
   a) adding one or more viscosity controlling agents into a stream of liquid monomers, oligomers, or mixtures thereof to form a reaction mixture;
   b) feeding the reaction mixture through an inlet means into a reaction chamber, causing the reaction mixture to polymerise in the reaction chamber and collecting resulting polymer at a polymerisation reactor outlet means, wherein flow rates and temperatures are maintained at substantially constant values, and pressure drop values between the inlet means and the outlet means are monitored by a control means which is adapted to detect and correct variations in said pressure drop from a predetermined value.

9. The process as recited in claim 8, wherein the polymers are liquid organosiloxane materials made by polymerisation of organosilicon compounds with silicon-bonded —OR radicals, wherein R is a hydrogen atom or an alkyl group having up to 6 carbon atoms, with the proviso that at least one R group per molecule is hydrogen.

10. The process as recited in claim 9, wherein the organosilicon compounds comprise short chain linear polydiorganosiloxane materials having silanol end-groups of the formula

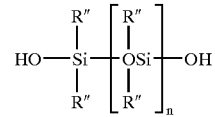

wherein n is an integer having a value of no more than 100 and each R" is a silicon-bonded organic substituent.

11. The process as recited in claim 10, wherein the viscosity controlling agent is a catalyst or endblocker.

12. The process as recited in claim 11, wherein the catalyst is selected from the group consisting of dodecylbenzene sulphonic acid, n-hexylamine, tetramethylguanidine, carboxylates of rubidium or cesium, hydroxides of magnesium, calcium or strontium and phosphonitrile chloride catalysts of the general formula $[X(PX_2=N)_sPX_3]^+[MX_{(v-r+1)}R'''_r]^-$, wherein X is a halogen atom, M is an element having an electronegativity of from 1.0 to 2.0 according to Pauling's scale, $R'''$ is an alkyl group having up to 12 carbon atoms, s is from 1 to 6, v is the oxidation state of M, and t is from 0 to v−1.

13. The process as recited in claim 11, wherein the end blocker is selected from the group consisting of a triorganoalkoxy silane, a triorganosilanol, a polydiorganosiloxane end-blocked with a triorganosiloxane group at one end and a hydroxyldiorganosiloxane group at the other end, polydiorganosiloxanes having only triorganosiloxane end-groups, and a silazane.

14. The process as recited in claim 13, wherein the reaction is carried out at a temperature of from about 30° C. to about 300° C.

15. The process as recited in claim 14, wherein the adjustment in the level of viscosity controlling agent added is a function of $$OV = \frac{100}{PB}\left[(SP-PV) + \frac{1}{T_I}\int_0^\tau (SP-PV)*dt - T_D*\frac{dPV}{dt}\right] \quad (6)$$

wherein OV is a percentage of the maximum pump flow rate, PB is a proportional band width, SP is a set point value, PV is a process value and $T_D$ is the differential time.

* * * * *